Figure 1:
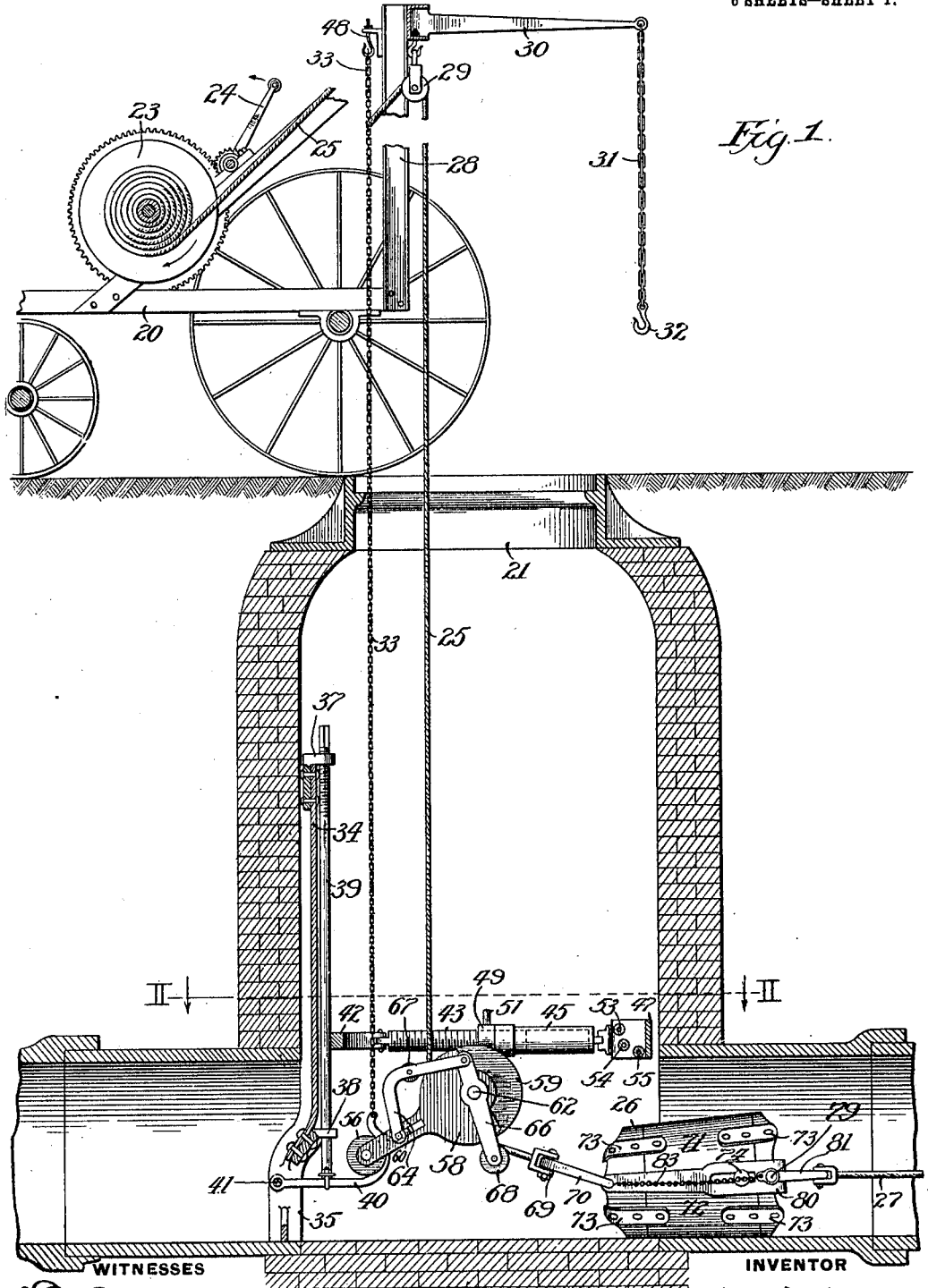

J. F. KUHLMAN.
SEWER CLEANING APPARATUS.
APPLICATION FILED MAY 14, 1909.

955,812.

Patented Apr. 19, 1910.
6 SHEETS—SHEET 1.

WITNESSES

INVENTOR
John F. Kuhlman

J. F. KUHLMAN.
SEWER CLEANING APPARATUS.
APPLICATION FILED MAY 14, 1909.
955,812.
Patented Apr. 19, 1910.
6 SHEETS—SHEET 2.
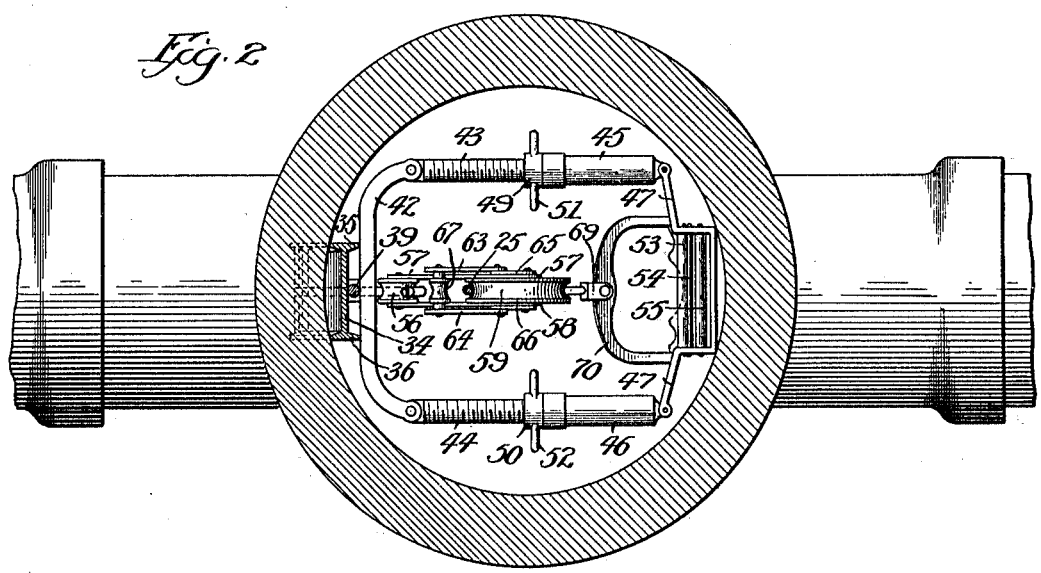
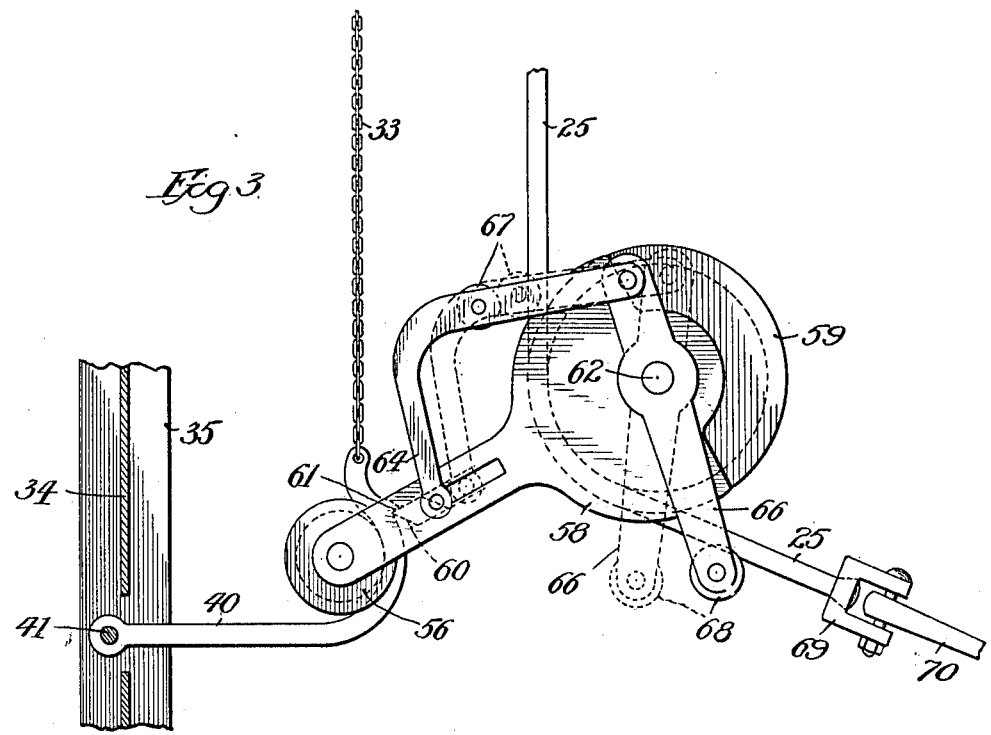

J. F. KUHLMAN.
SEWER CLEANING APPARATUS.
APPLICATION FILED MAY 14, 1909.
955,812.
Patented Apr. 19, 1910.
6 SHEETS—SHEET 3.
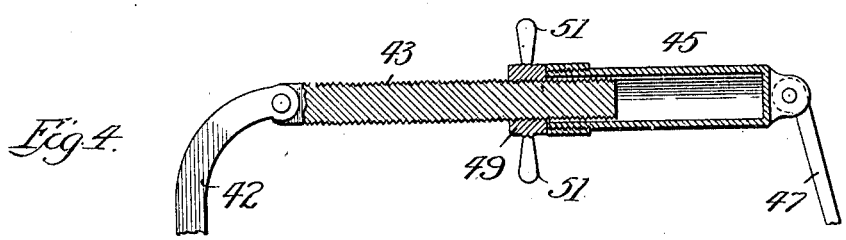
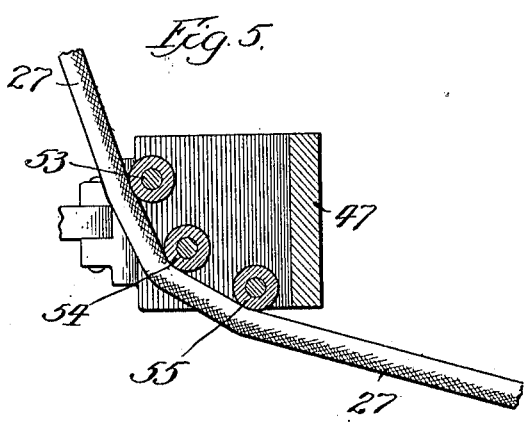
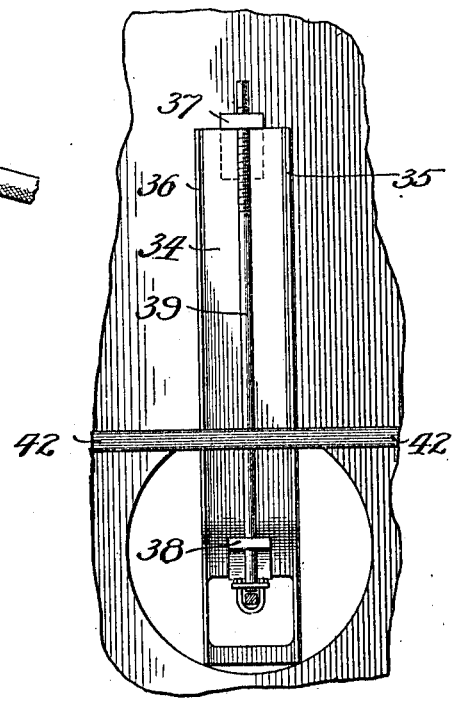
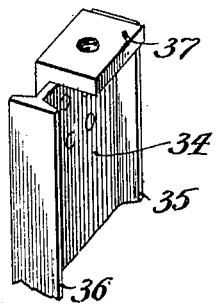
WITNESSES
INVENTOR J. F. KUHLMAN.
SEWER CLEANING APPARATUS.
APPLICATION FILED MAY 14, 1909.
955,812.
Patented Apr. 19, 1910.
6 SHEETS—SHEET 4.
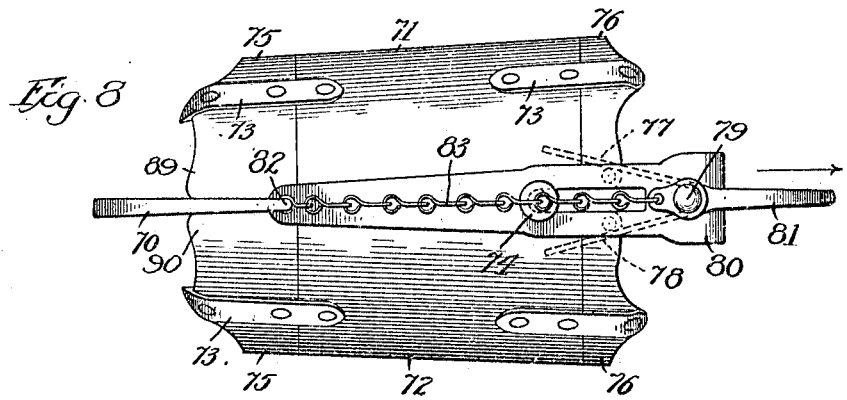
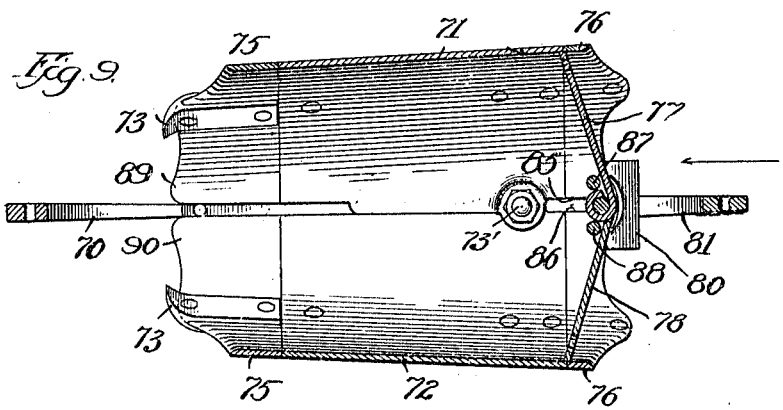
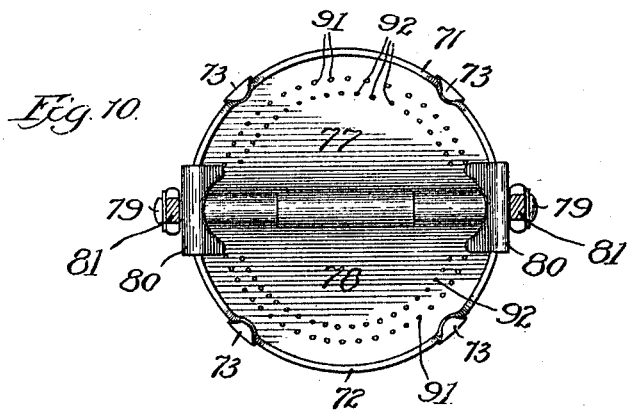
WITNESSES
INVENTOR J. F. KUHLMAN.
SEWER CLEANING APPARATUS.
APPLICATION FILED MAY 14, 1909.
955,812.
Patented Apr. 19, 1910.
6 SHEETS—SHEET 5.
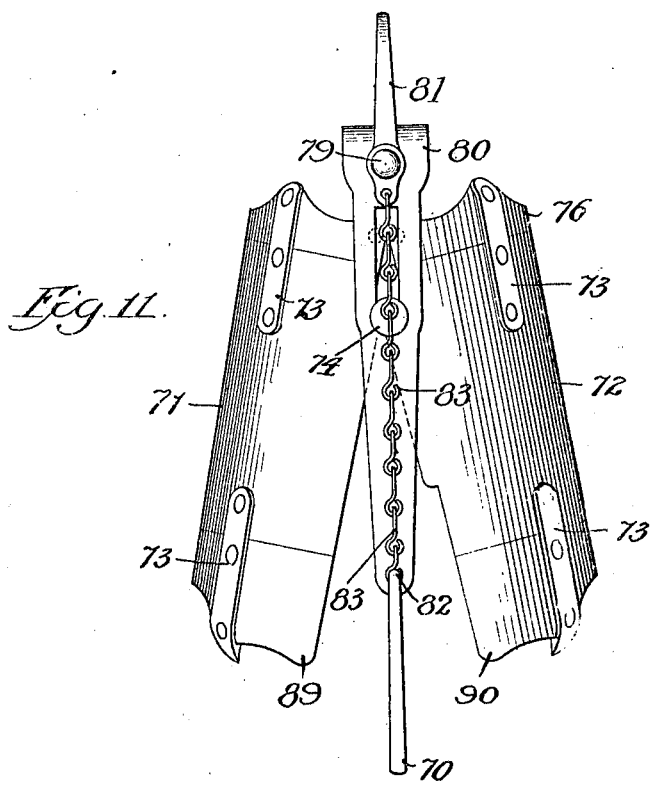
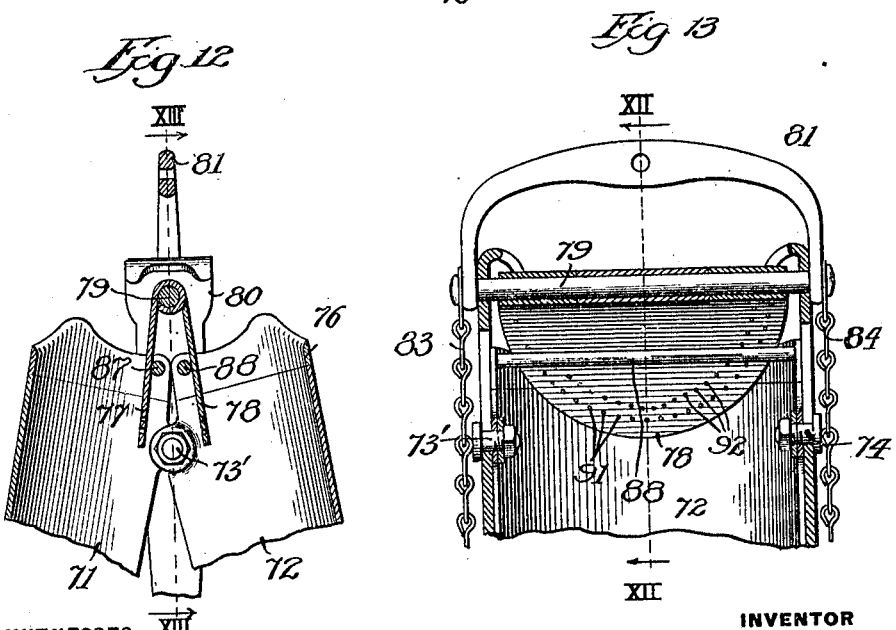
WITNESSES
INVENTOR
John F. Kuhlman

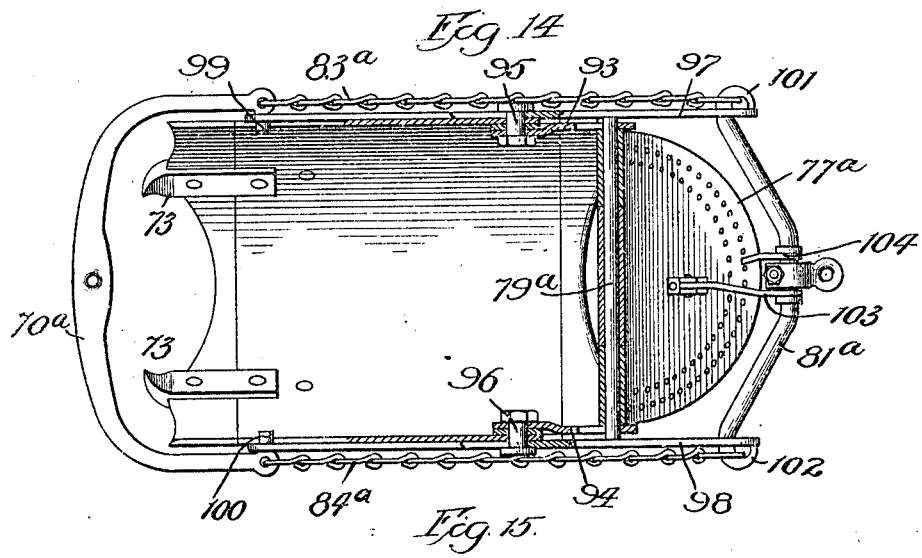
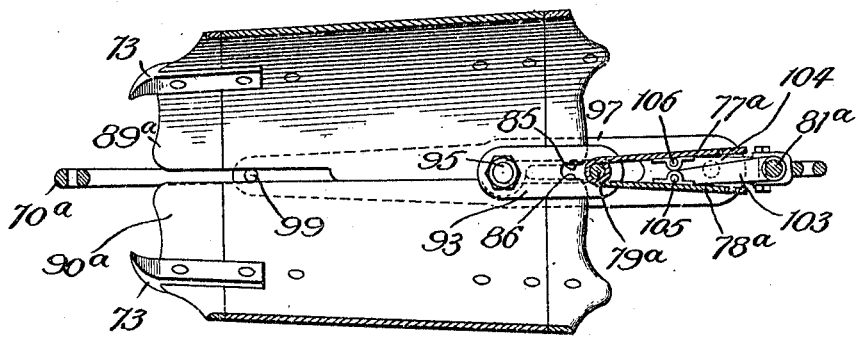
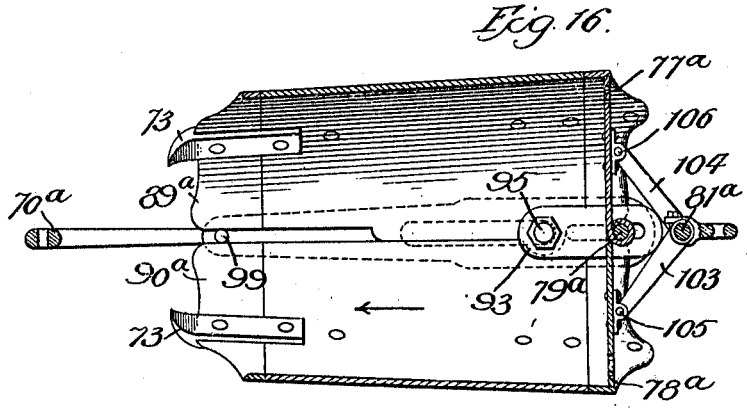

UNITED STATES PATENT OFFICE.

JOHN F. KUHLMAN, OF HAMMOND, INDIANA.

SEWER-CLEANING APPARATUS.

955,812.  Specification of Letters Patent.  Patented Apr. 19, 1910.

Application filed May 14, 1909. Serial No. 496,033.

*To all whom it may concern:*

Be it known that I, JOHN F. KUHLMAN, a citizen of the United States, residing at Hammond, in the county of Lake and State of Indiana, have invented certain new and useful Improvements in Sewer-Cleaning Apparatus, of which the following is a specification.

My invention relates to sewer cleaning apparatus in general, and particularly to that type of construction wherein a dredging bucket is inserted at one manhole and drawn through a length of sewer toward another manhole by means of a cable or chain passing through the manhole and operated adjacent to it by a dragging and lifting apparatus such as a portable engine, windlass or winch, and has for its principal objects the provision of a sewer cleaning or scraping device having improved means for guiding the dredging bucket as it is drawn through the sewer and for preventing the stoppage of the bucket by obstructions in the sewer; the provision of an improved form of bucket of great strength and high scraping qualities, the wearing parts whereof may be readily removed and replaced, one which will be self draining, which may be dumped with the greatest facility and which will not readily get out of order; the provision of improved apparatus for handling the bucket whereby it may be drawn through the sewer and lifted through the manhole, without harm to the operating cables; the provision of improved lifting and handling apparatus adapted to be readily and firmly anchored in place in the manhole; the provision of a construction of handling apparatus of moderate cost and great simplicity whereby the several operations of dredging the material, raising it through the manhole and dumping and scouring the bucket are performed easily and expeditiously; the provision of an improved form of dredging bucket which when brought into dumping position will automatically open, discharge its load and scour itself.

The above objects together with such others as will hereinafter appear, and such additional advantages as will occur to those who are skilled in the art to which my invention pertains, I attain by means of the construction illustrated in the accompanying drawings, wherein—

Figure 1 is a transverse sectional elevation through a sewer manhole and the adjacent parts of the sewer, and illustrates my improved apparatus in side elevation; Fig. 2 is a plan view taken on the line II—II of Fig. 1 showing the means for fixing the handling apparatus in position in the manhole; Fig. 3 is an enlarged detail of the locking and releasing mechanism for the sheave which guides the main operating cable while the dredging bucket is being dragged through the sewer; Fig. 4 is an enlarged detail of part of the anchoring device of the handling apparatus; Fig. 5 is an enlarged detail of an arrangement of rollers for the protection of the cable by which the bucket is drawn into the sewer, during the lifting of the bucket through the manhole; Fig. 6 is a detail of the interior of the manhole showing part of the anchoring means in elevation; Fig. 7 is a detail of the top of the anchoring beam; Figs. 8, 9 and 10 are respectively a side elevation, a longitudinal section, and an end elevation looking toward the interior of one form of my improved dredging bucket in closed position; Fig. 11 is an elevation of the bucket of Figs. 8, 9 and 10 in open or dumping position; Fig. 12 is a sectional elevation of the bucket in the position shown in Fig. 11 taken on the line XII—XII of Fig. 13; Fig. 13 is a vertical sectional elevation of the bucket taken on the line XIII—XIII of Fig. 12; Figs. 14, 15 and 16 are sectional elevations illustrative of a modified form of dredging bucket wherein the doors open outwardly instead of toward the interior of the bucket as in Figs. 8 to 13.

In that type of apparatus to which my invention relates, cables or chains are commonly attached to the ends of the dredging bucket or scraper to the end that when the bucket has been pulled into the sewer from a manhole and filled, it can be pulled out of an adjacent manhole and dumped and then returned through the same manhole and the operation repeated. I have shown only those parts of the sewer adjacent the manhole at which the bucket is dumped, and have provided no illustration of the means for dragging the bucket into the sewer, but it will be apparent that these means may be of any desired construction adaptable for the purpose of which a number are known to those skilled in the art and may be similar to those illustrated in Fig. 1, and it is believed that the views shown will adequately illustrate the invention which I now describe and more particularly point out in the claims.

For the purpose of operating the withdrawing cable, I have provided a wheeled truck 20 adapted to be placed astride the manhole 21 or in such other position relative thereto as may be convenient for the operation of my apparatus. This movable truck is equipped with a drum, 23, having geared connection with an operating handle, 24, and fixed to the said drum is one end of the main cable, 25, the other end of which is attached to one end of the dredging bucket 26. At the other end of the bucket there is attached another cable, 27, which is preferably operated from a similar device at an adjacent manhole, (not shown).

At one end of the frame, 20, I provide a vertical standard, 28, provided with a sheave, 29, over which the cable, 25, passes and likewise provided with a pivoted arm, 30, at the end of which there is a chain, 31, having a hook, 32, for engagement with the bucket, 26, when it is lifted through the manhole at some convenient place on the truck frame, 20, preferably the standard, 28, I attach a trolley chain or cable, 33, by which the bucket, 26, will be guided as it runs through the manhole.

One of the highly important features of my invention lies in the arrangement of parts whereby the bucket may be operated relatively to the sewer and removed from the manhole for dumping without being obstructed by the sewer pipe or manhole parts. In this arrangement I provide the I-beam, 34, the flanges of which, 35 and 36, are pressed against the manhole wall and one end of the beam rests on the bottom of the sewer, adjacent which I provide a bracket, 38, the other being provided with a bracket, 37, (see Fig. 7), both brackets being apertured to receive a rod, 39, one end of said rod being screw threaded in bracket, 37, and the other end yoked to the hook, 40, pivoted at 41 between the flanges, 35 and 36, of the I-beam, 34, to the end that the hook, 40, may be adjusted about its axis as circumstances may require in order to give proper tension upon the trolley chain, 33. For the purpose of anchoring the beam and parts connected therewith firmly in position in the manhole I provide the expansion device most clearly illustrated in Fig. 2 wherein it will be noted that at each end of the yoke, 42, are pivoted exteriorly threaded members, 43 and 44, received by corresponding plain socket members 45 and 46 respectively pivoted to a yoke, 47, bearing against that part of the manhole opposite to the I-beam, 34. For the purpose of operating the expanding device and thereby fixing the arrangement firmly in position I provide the threaded members 49 and 50 which may be manipulated by the handles 51 and 52, (see Fig. 4).

From an inspection of Figs. 1 and 5, it will be observed that to save the cable, 27, from becoming damaged as the bucket, 26, is withdrawn from the manhole, I have mounted in the yoke, 47, a series of rollers, 53, 54 and 55, which will not only prevent cutting or fraying of the cable but also will avoid causing short bends or kinks therein.

The arrangement and operation of my improved form of locking and releasing device for the pulley, 59, will be apparent from an inspection of Figs. 1 and 3. It will be there observed that the chain, 33, suspended from the hook, 48, on the wheeled truck and attached at its lower end to the hook, 40, provides a trolley upon which the concave trolley wheel, 56, may ride when the bucket is lifted, such wheel being carried between plates 57 and 58 which likewise carry the grooved sheave, 59, over which the cable, 25, runs. The wheel, 56, is normally held in contact with the hook 40, by means of a latch, 60, (see Fig. 3,) engaging a shoulder, 61, on such hook, the said latch being carried between the crank arms, 63 and 64, respectively, mounted outside of the connecting plates, 57 and 58, and having pivotal connections respectively to links indicated at 65 and 66 which are in turn pivoted upon the shaft, 62, of the sheave, 59. Between the crank arms, 63 and 64, is also located a grooved roller, 67, and at the lower ends of the pivoted links, 65 and 66, is mounted another grooved roller, 68, all so arranged that when the clevis, 69, attached to the bail, 70, of the bucket, 26, strikes the roller, 68, the latch, 60, will be withdrawn from its engagement with the hook, 61, and the roller, 67, forced against the cable, 25, locking said cable between the said roller and the sheave, 59, so that the sheave, 56, and connected parts will be free to ride upward guided upon the trolley chain, 33.

Referring now more particularly to Figs. 8 to 13, it will be seen that I have here illustrated another highly important feature of my invention which resides in the construction of dredging bucket here illustrated, the said bucket consisting in a pair of supplemental semicylindrical segments, 71 and 72, of substantially like contour. The said segments are pivoted together at their opposite edges, 73' and 74, and are provided with a plurality of strengthening ribs or runners, 73, which not only are useful as slides upon which the bucket may be dragged through the sewer, but also serve as stiffening members and further as means whereby the cutting edges, 75 and 76, of the bucket may be firmly fastened thereto, and be readily removed when worn, thus permitting the use of material not only lighter in weight but also less expensive in quality than would be necessary were the halves of the bucket to be made integral throughout their length and left unprovided with renewable cutters or with runners upon which to ride. From an examination of Figs. 8 and 9 it will be apparent that the outstanding runners are preferably pointed somewhat inwardly in order that as the bucket is drawn through the sewer they will not catch on any projecting bricks, lumps of mortar, or crevices that may be present owing to the faulty construction of the brick work or piping of the sewer. The runners, 73, are preferably forked as clearly shown in Fig. 9 in order more firmly to hold the cutter edges, 75 and 76, in position, and prevent them from being torn or broken away from the body of the bucket.
From an inspection of Fig. 8 it will be apparent that for the closure of the bucket when filled by its movement in the direction indicated by the arrow, I have provided the doors, 77 and 78, which, when the movement of the bucket is reversed as indicated by the arrow in Fig. 9, completely close the end of the bucket at which they are mounted. These doors are hinged upon a shaft, 79, carried in yoke members, 80, having turned over ends for limiting the outward movement of the doors, 77 and 78. The yoke members also have slotted engagement with the connecting bolts, 73' and 74, the free ends of said yoke being connected by a bail, 70, to which the cable, 25, is attached, such yoke having also connected thereto by means of the shaft, 79, a bail, 81, to which the cable, 27, is attached, the respective ends of the bails, 70 and 81, being connected by the chains, 83 and 84, to prevent disengagement from the bucket in the event of breakage of the shaft, 79, or the hook connections one of which is indicated at 82. From Fig. 9 it will also be apparent that when the bucket is moved in the direction indicated by the arrow therein, the shaft, 79, will pass between the cutaway portions, 85 and 86, of the two segments of the bucket and the doors, 77 and 78, by their contact with the studs, 87 and 88, will be forced outward to close that end of the bucket and at the same time the interposition of the said shaft, 79, between the two halves of the bucket will prevent the opposite ends, 89 and 90, from spreading and thus discharging any part of its solid contents *en route* to the manhole. From Fig. 10 it will be seen that to facilitate the discharge of any water that may be taken up by the bucket I have provided the doors, 77 and 78, with rows of perforations 91 and 92.

Referring to Figs. 14, 15 and 16 wherein I have illustrated a modification of my improved dredging bucket it will be noted that the doors, 77$^a$ and 78$^a$, open outwardly instead of toward the interior of the bucket. These doors are arranged upon a shaft, 79$^a$, carried in slotted links, 93 and 94, the said links being fixed to the bucket by the bolts, 95 and 96, respectively, the outer ends of the said shaft, 79$^a$, passing through slots in the side yoke members, 97 and 98, which are also attached to the bucket by the said bolts, 95 and 96, the free ends of the yoke members being connected by a bail, 70$^a$, to which the cable, 25, is attached. Such yoke members have also engagement with a bail, 81$^a$, to which the cable, 27, is attached, the respective ends of the bails, 70$^a$ and 81$^a$, being connected by the chains 83$^a$ and 84$^a$, to prevent disengagement from the bucket in the event of breakage of the hook connections indicated at 99 and 100, and 101 and 102 respectively. The bail, 81$^a$, has operative connection with the doors, 77$^a$, and 78$^a$, by the connecting rods 103 and 104 respectively hinged thereto as indicated at 105 and 106. From an inspection of Fig. 16 particularly it will be apparent that when the bucket is moved in the direction indicated by the arrow therein the shaft, 79$^a$, will pass between the cutaway portions, 85 and 86, (see Fig. 15,) of the two segments of the bucket and the doors, 77$^a$ and 78$^a$, by the movement transmitted to the bail 81$^a$ will be forced inward and close the corresponding end of the bucket, and at the same time the interposition of the shaft, 79$^a$, between the two halves of the bucket will prevent the opposite ends, 89$^a$ and 90$^a$, from spreading and permitting the discharge of any part of the solid contents of the bucket.

It will be observed that when the filled bucket is drawn to the top of the manhole the chain, 31, may be attached to the bail, 81, by the hook, 32, and the bucket swung to the desired position by the movement of the arm 30. This operation will withdraw the shaft, 79, from between the two segments of the bucket 71 and 72 and the weight of the contents thereof will tend to cause the bucket to assume the position illustrated in Fig. 11 wherein the ends 89 and 90 have moved apart and the contents thereby immediately discharged without friction on the adjacent halves of the bucket. The hook, 32, may then be disengaged from the bail, 81, the bucket lowered into the manhole and on application of power to the cable, 27, from an adjacent manhole the doors, 77 and 78 will assume the position shown in Fig. 8 when pressed against the dirt in the sewer, and the bucket may then be dragged toward said neighboring manhole a distance sufficient again to fill it. The operation may then be repeated as often as necessary thoroughly to clean the sewer.

Having thus described my invention and illustrated its use what I claim as new and desire to secure by Letters Patent is the following:—

1. In combination in a sewer scraper, a dredging bucket provided with a removable cutting plate and strengthening ribs connected to the cutting plate and to the bucket, and having their wearing surfaces lying outside and protecting the outside face of the plate.

2. In combination in a sewer scraper, a dredging bucket provided with a removable cutting edge and a strengthening rib fixed to the bucket and provided with a slot in which the edge fits.

3. In combination in a sewer scraper, a dredging bucket provided with removable cutting edges and attaching ribs therefor lying outside the cutting edges and curved toward the longitudinal axis of the bucket.

4. In combination in a sewer scraper, a dredging bucket comprising a body portion, a yoke mounted upon said body portion and movable relative thereto, and a pair of doors hinged relatively to said yoke and operable thereby, said doors being adapted to open when said yoke is moved in one direction, and to close when said yoke is moved in the opposite direction.

5. In combination in a sewer scraper, a dredging bucket comprising a body portion, a yoke mounted upon said body portion and movable relative thereto, a pair of doors hinged relatively to said yoke and operable thereby and bails pivoted at each end of said yoke adapted to open when said yoke is moved in one direction, and to close when said yoke is moved in the opposite direction.

6. In combination in a sewer scraper, a dredging bucket comprising a pair of complementary segments pivoted together, a yoke mounted upon said segments, a pair of doors hinged relatively to said yoke, and bails pivoted at each end of said yoke, adapted to open said bucket when said yoke is moved in one direction, and to close said bucket when said yoke is moved in the opposite direction, and chain connections between the respective ends of said bails.

7. In combination in a sewer cleaner, a pair of complemental segmental sections pivoted together, a yoke carried upon said sections, a shaft carried by said yoke, a pair of doors hinged upon said shaft, and connections whereby said yoke may be moved relatively to said sections in both directions, all so arranged that when the yoke is moved in one direction the doors open and the sections are free to move relatively to each other and when the yoke is moved in the other direction the shaft will pass between the sections and the doors will close locking said sections and doors relatively to each other.

8. In combination in a sewer cleaner, a pair of complemental segmental sections pivoted together, a member for dragging the sections longitudinally, pivoted closing means for the sections, and connections so arranged that when the member is moved in one direction the closing means open and the sections are free to move relatively to each other, and when the member is moved in the other direction both the sections and closing means will close.

9. In combination, in a sewer cleaning apparatus, a flexible trolley runway, means for anchoring the upper end of the runway above the sewer manhole, means for anchoring the lower end of the runway adjacent the lower end of the manhole, a trolley mounted on the runway, stop means and locking means for the trolley adjacent the lower end of the runway, a dredging bucket, flexible means secured to the bucket and passing through the trolley and manhole, and means for disengaging the locking means to permit the trolley to rise on the runway with the bucket.

10. In combination, in a sewer cleaning apparatus, a flexible trolley runway, means for anchoring the upper end of the runway above the sewer manhole, means for anchoring the lower end of the runway adjacent the lower end of the manhole, a trolley on the runway, a dredging bucket, flexible means secured to the scraper and passing through the trolley and manhole, and means whereby the trolley is prevented from rising on the runway until the bucket approaches the trolley.

11. In combination, in sewer cleaning apparatus, a trolley runway above the manhole, means for carrying one end of said runway, and means for anchoring the bottom of said runway in a manhole, comprising a pair of frictional devices adapted to grip the opposite sides of the manhole, and interposed expansion devices for spreading said frictional devices apart.

12. In combination, in sewer cleaning apparatus, a trolley runway, a movable truck carrying one end of said runway and means for anchoring the bottom of said runway in a manhole, comprising a pair of frictional devices adapted to grip the opposite sides of the manhole, and a pair of interposed turnbuckles for forcing the friction blocks apart and against the wall of the manhole.

13. In combination, in sewer cleaning apparatus, a trolley runway, means for holding the top of the runway in the manhole, means for anchoring the bottom of the runway in the manhole, and means for vertical adjustment of the runway comprising a beam, a member pivoted to said beam, and a member screw threaded at one end upon said beam and at the other end secured to said pivoted member.

14. In combination, in sewer cleaning apparatus, a flexible trolley runway, means for holding the top of the runway in the manhole, means for anchoring the bottom of the runway in the manhole, and means for vertical adjustment of the runway whereby it may be tightened.

15. In combination in a sewer scraper, a body portion, a cutting plate therefor having its rear edge abutting the front edge of the body portion, and wearing ribs overlapping and secured to both the body portion and cutting plate.

16. In combination in a sewer cleaning apparatus, an upright guide adapted to be anchored in the outlet of a sewer, a trolley mounted on the guide, a dredging bucket, flexible means for dragging the bucket through the sewer passing through the trolley and outlet, locking means for maintaining the trolley in its lower position, and means operated on the approach of the bucket to the guide for releasing the locking means.

17. In combination in sewer cleaning apparatus, and upright guide adapted to be anchored in the outlet of a sewer, a trolley mounted on the guide, a dredging bucket, flexible means for dragging the bucket through the sewer passing through the trolley and outlet, a latch for locking the trolley to the guide at the lower end thereof and operated on the approach of the bucket to the guide for releasing the latch.

18. In combination in a sewer cleaning apparatus, an upright guide adapted to be anchored in the outlet of a sewer, a trolley mounted on the guide, a dredging bucket, flexible means for dragging the bucket through the sewer passing through the trolley and outlet, locking means for maintaining the trolley in its lower position, and automatic means operated by the approach of the bucket to the guide for releasing the locking means and for clamping the trolley to the flexible means.

19. In combination in a sewer cleaning apparatus, an upright guide adapted to be anchored in the outlet of a sewer, a trolley mounted on the guide, a dredging bucket, flexible means for dragging the bucket through the sewer passing through the trolley and outlet, means whereby the trolley is releasably maintained in its lower position, and mechanism operated by the approach of the bucket to the guide for clamping the trolley to the flexible means.

In testimony whereof I have hereunto signed my name in the presence of the two subscribed witnesses.

JOHN F. KUHLMAN.

Witnesses:
PAUL CARPENTER,
GEO. C. DAVISON.